(12) United States Patent
Mahmoud et al.

(10) Patent No.: US 8,133,416 B2
(45) Date of Patent: Mar. 13, 2012

(54) ULTRAVIOLET SHIELDING COMPOUND

(75) Inventors: Waleed Elsayed Mahmoud, Jeddah (SA); Ahmed Abdullah Salem Al-Ghamdi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 63 days.

(21) Appl. No.: 12/591,363

(22) Filed: Nov. 17, 2009

(65) Prior Publication Data

US 2011/0114903 A1   May 19, 2011

(51) Int. Cl.
*F21V 9/04* (2006.01)
*F21V 9/06* (2006.01)
*G02B 5/22* (2006.01)
*G02B 5/26* (2006.01)

(52) U.S. Cl. ..... 252/589; 427/123; 427/162; 427/163.1; 428/327; 430/5; 430/428; 524/338

(58) Field of Classification Search ........... 252/589; 430/428, 323, 324, 325, 5, 163; 361/502; 562/549; 156/625, 643, 659.1, 660; 427/123, 427/162, 163.1; 428/327; 524/338
See application file for complete search history.

(56) References Cited

U.S. PATENT DOCUMENTS

| | | | |
|---|---|---|---|
| 1,916,350 A | 7/1933 | Wendt et al. | |
| 3,211,553 A | 10/1965 | Ito | |
| 3,266,370 A | 8/1966 | Marks et al. | |
| 3,539,376 A | 11/1970 | Otani et al. | |
| 3,932,690 A | 1/1976 | Gliemeroth | |
| 3,950,591 A | 4/1976 | Gliemeroth et al. | |
| 4,054,684 A | 10/1977 | Ceintrey et al. | |
| 4,327,128 A | 4/1982 | Thurlow | |
| 4,822,147 A | 4/1989 | Park | |
| 5,022,742 A | 6/1991 | Hains | |
| 5,178,989 A * | 1/1993 | Heller et al. | 430/323 |

FOREIGN PATENT DOCUMENTS

| | | |
|---|---|---|
| GB | 373858 A | 6/1932 |
| GB | 585477 A | 2/1947 |
| GB | 849103 A | 9/1960 |
| GB | 1008537 A | 10/1965 |
| GB | 1010203 A | 11/1965 |
| GB | 1482254 A | 8/1977 |

OTHER PUBLICATIONS

C.W. Lin , R. Thangamuthu, C.J. Yang, Proton-conducting membranes with high selectivity from phosphotungstic acid-doped poly-(vinyl alcohol) for DMFC applications, Journal of Membrane Science 253 (2005) 23-31, © 2005 Elsevier B.V. All rights reserved.*

* cited by examiner

*Primary Examiner* — Harold Pyon
*Assistant Examiner* — Bijan Ahvazi
(74) *Attorney, Agent, or Firm* — Richard C. Litman

(57) ABSTRACT

The ultraviolet shielding compound is highly transparent in the visible light spectrum and shields approximately 100% of ultraviolet A (UVA), ultraviolet B (UVB) and ultraviolet C (UVC) radiation. The ultraviolet shielding compound is formed from polyvinyl alcohol (PYA) doped with phosphotungstic acid ($H_3PW_{12}O_{40}$). Preferably, the ratio of phosphotungstic acid to polyvinyl alcohol is 1. The ultraviolet shielding compound may be formed by first making a polymeric solution of polyvinyl alcohol dissolved in deionized water. Next, phosphotungstic acid is dissolved in deionized water to form an acidic solution. The acidic solution is added to the polymeric solution to form a mixture. The mixture is then thickened and cast. The cast mixture may then be dried to produce the ultraviolet shielding compound in the form of a flexible film.

6 Claims, 5 Drawing Sheets

ULTRAVIOLET SHIELDING COMPOUND

BACKGROUND OF THE INVENTION

1. Field of the Invention

The present invention relates to protection from ultraviolet radiation, and particularly to an ultraviolet shielding compound that is highly transparent in the visible light spectrum and provides a shield against approximately 100% of ultraviolet A (UVA), ultraviolet B (UVB) and ultraviolet C (UVC) radiation.

2. Description of the Related Art

Ultraviolet (UV) light is ionizing radiation having a wavelength spectrum between 180 and 400 nm. The ultraviolet spectrum is commonly divided into the following three regions, including the ultraviolet A (UVA or "black light"), which has a wavelength range between 315 and 400 nm; ultraviolet B (UVB or erythemal), which has a range between 280 and 314 nm; and ultraviolet C (UVC or germicidal), which has a wavelength range between 180 and 280 nm.

Environmental exposure to ultraviolet radiation is typically limited to the UVA region as a result of exposure to direct sunlight. The Earth's atmospheric shields most of the more harmful UVC radiation, and more than 99% of UVB radiation. However, some equipment can generate concentrated UV radiation in all of the spectral regions that, if used without the appropriate shielding and personal protective equipment, can cause injury with only a few seconds of exposure.

An unfortunate property of UV radiation is that there are no immediate warning symptoms to indicate overexposure. Symptoms of overexposure, including varying degrees of erythema (i.e., sunburn) or photokeratitis (i.e., "welder's flash") typically appear hours after exposure has occurred. In humans, prolonged exposure to solar UV radiation may result in acute and chronic health effects of the skin, eye, and immune system. UVC rays are the highest energy and, thus, are the most dangerous type of ultraviolet light. Little attention has been given to UVC rays in the past, since they are filtered out by the atmosphere. However, their use in equipment such as pond sterilization units may pose an exposure risk if the lamp is switched on outside of its enclosed pond sterilization unit.

Thus, an ultraviolet shielding compound solving the aforementioned problems is desired.

SUMMARY OF THE INVENTION

The ultraviolet shielding compound is highly transparent in the visible light spectrum and provides a shield against approximately 100% of ultraviolet A (UVA), ultraviolet B (UVB) and ultraviolet C (UVC) radiation. The ultraviolet shielding compound is formed from polyvinyl alcohol (PVA) doped with phosphotungstic acid (H3PW12O40). Preferably, the ratio of phosphotungstic acid to polyvinyl alcohol is 1.

The ultraviolet shielding compound may be formed by first making a polymeric solution of polyvinyl alcohol dissolved in deionized water. Next, phosphotungstic acid is dissolved in deionized water to form an acidic solution. The acidic solution is added to the polymeric solution to form a mixture. The mixture is then thickened and cast. The cast mixture is then dried to form an ultraviolet shielding compound.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The ultraviolet shielding compound is highly transparent in the visible light spectrum (allowing approximately 96% of light in the visible spectrum to pass therethrough), and shields approximately 100% of ultraviolet A (UVA), ultraviolet B (UVB) and ultraviolet C (UVC) radiation. The ultraviolet shielding compound is formed from polyvinyl alcohol (PVA) doped with phosphotungstic acid ($H_3PW_{12}O_{40}$). Preferably, the ratio of phosphotungstic acid to polyvinyl alcohol is 1. The following Example illustrates preparation of the compound.

Example

A film of polyvinyl alcohol (PVA) filled with phosphotungstic acid ($H_3PW_{12}O_{40}$) was prepared by casting as follows. A polymer solution was prepared by adding 6 g of PVA (average molecular weight of 17 kg/mol, obtained from Aldrich) to 100 mL of deionized water and stirring at 70° C. for three hours to give a viscous, transparent solution. A solution of phosphotungstic acid was prepared by dissolving 3 g of $H_3PW_{12}O_{40}$ (obtained from Alpha Aesar and used as received 0 in deionized water, which was then added to the polymeric solution of PVA. The mixture was left for two hours at room temperature to reach a suitable viscosity. After that, the mixture was cast in glass dishes and left to dry in a dry atmosphere at room temperature. Samples were transferred to an electric oven held at 60° C. for forty-eight hours to minimize the residual solvent. The product that was obtained was a film having a thickness in the range of 0.1±0.01 mm.

Figure 1:
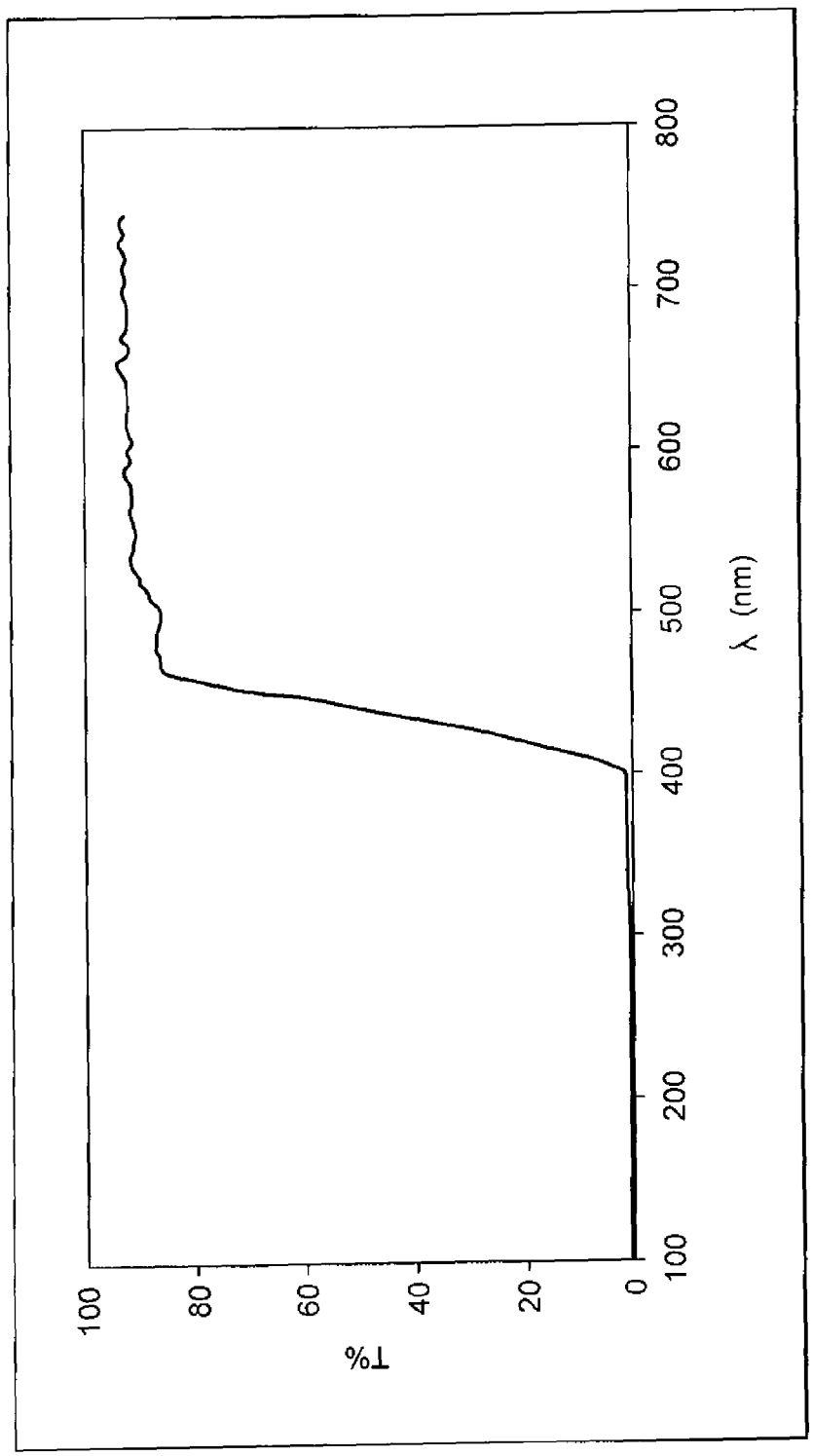
FIG. 1 is a graph illustrating optical transmittance as a function of wavelength for the ultraviolet shielding compound according to the present invention.
Figure 2:
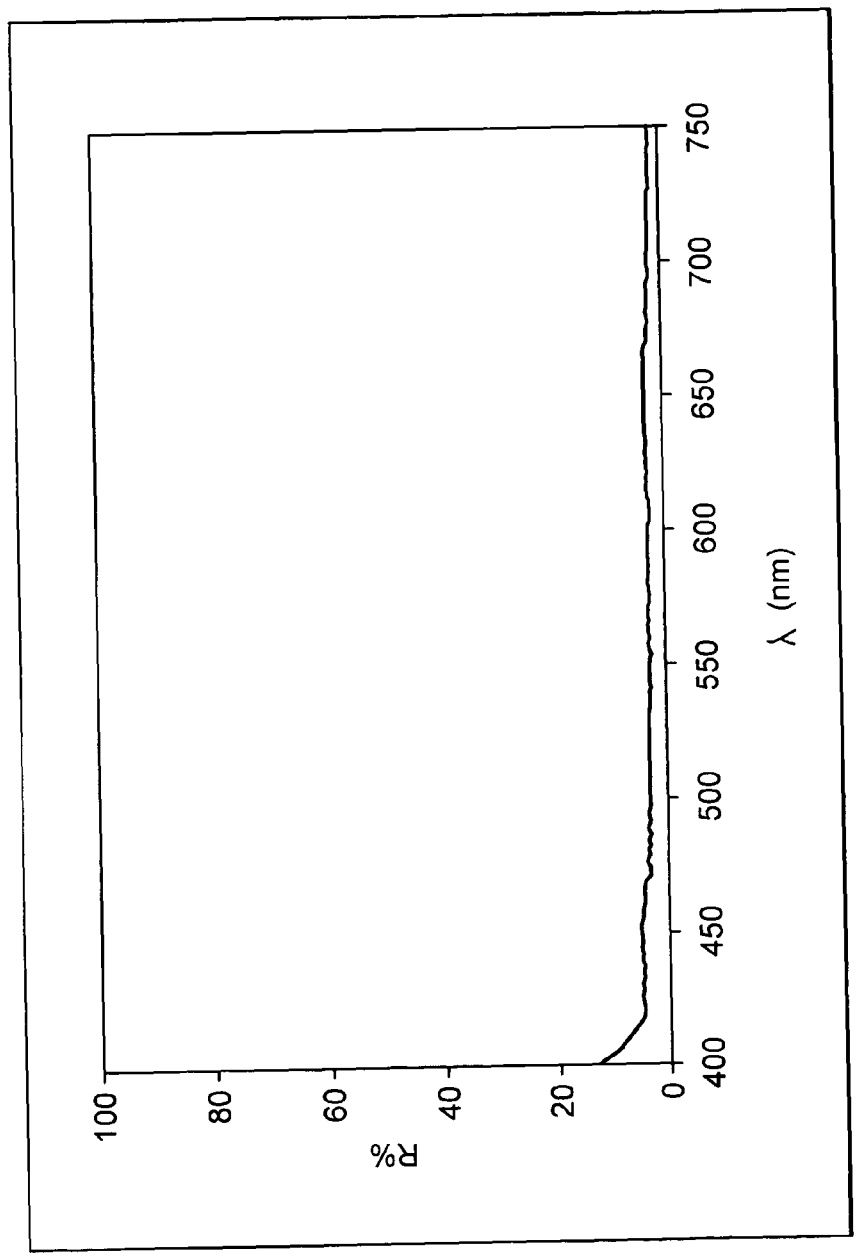
FIG. 2 is a graph illustrating optical reflectance as a function of wavelength for the ultraviolet shielding compound according to the present invention.

The resultant product is a flexible film. The film was subsequently tested as follows. A Jasco V-570 UV/VIS/NIR spectrophotometer was used for measuring the transmittance and reflectance spectra of the film in the range of 190-800 nm. FIGS. 1 and 2 illustrate the transmittance and reflectance spectra of the compound, respectively. FIG. 1 illustrates that the compound shields approximately 100% of ultraviolet radiation in the wavelength region of 190 to 400 nm. FIG. 1 also shows that the compound is also highly transparent in the visible spectrum, having a transmittance of approximately 96%.

Figure 3:
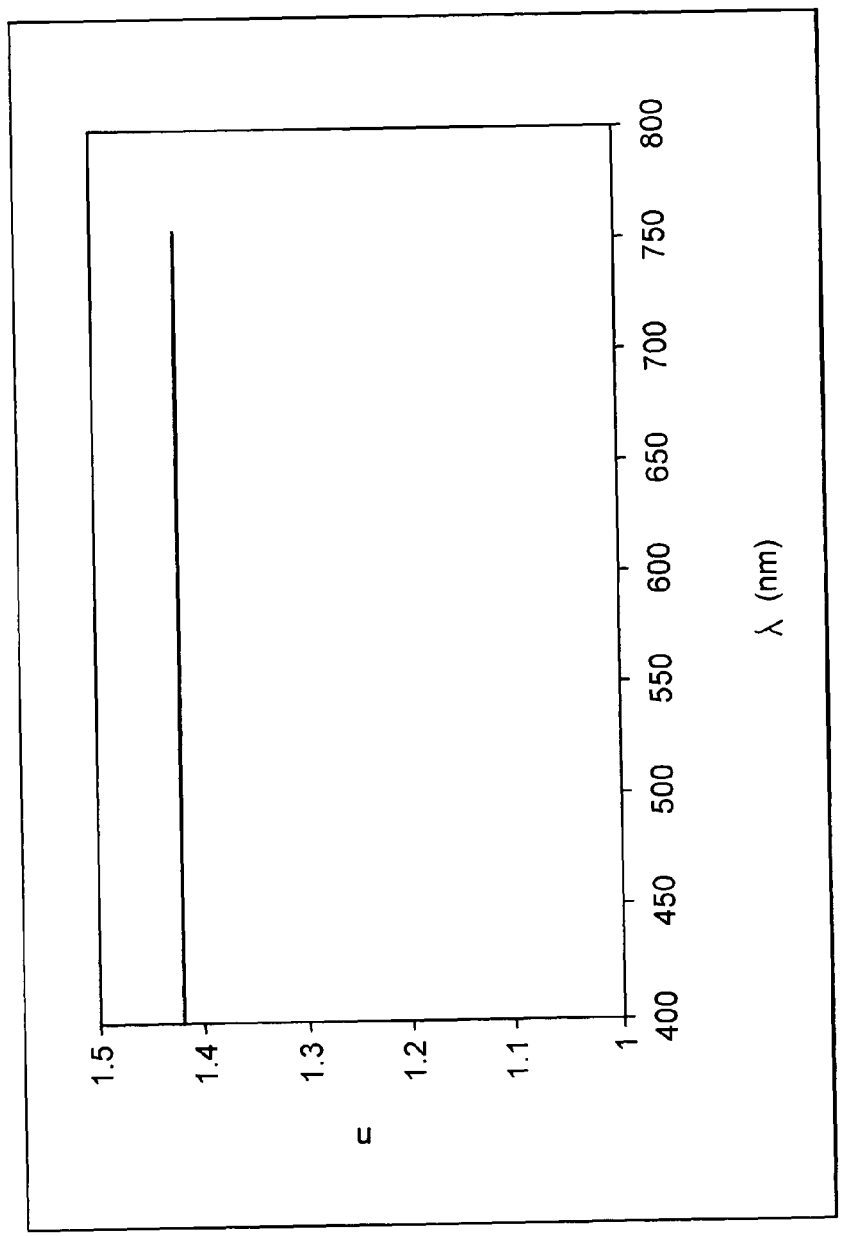
FIG. 3 is a graph illustrating refractive index as a function of wavelength for the ultraviolet shielding compound according to the present invention.

Similarly, the reflectance of the compound is shown in FIG. 2. As shown in FIG. 2, the film's reflectance in the visible wavelength region has a value of approximately 1%. FIG. 3 shows the refractive index of the compound as a function of wavelength. The refractive index was found to be approximately 1.41.

Figure 4:
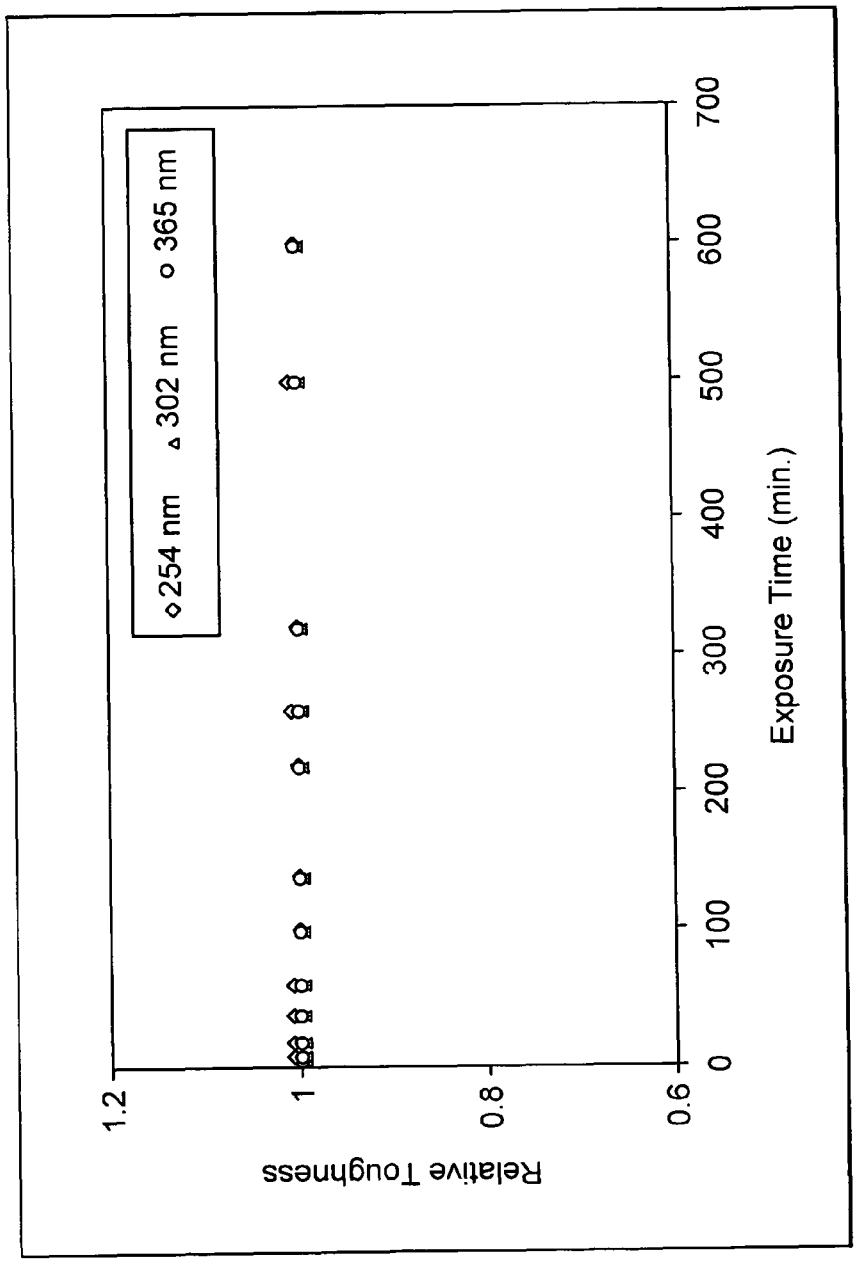
FIG. 4 is a graph illustrating relative toughness of the ultraviolet shielding compound as a function of exposure time to varying ultraviolet wavelengths.
Figure 5:
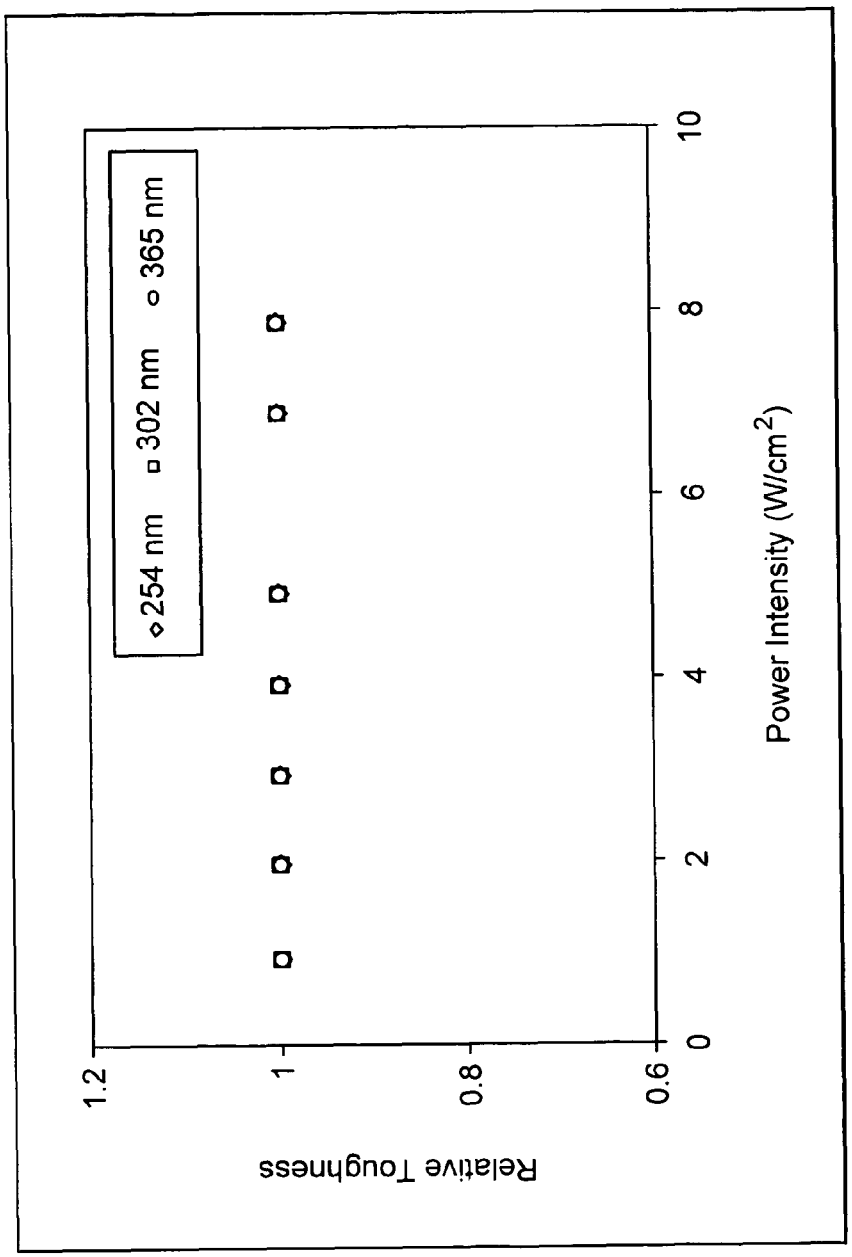
FIG. 5 is a graph illustrating relative toughness of the ultraviolet shielding compound as a function of power intensity of varying ultraviolet wavelengths.

Additionally, the effect of ultraviolet radiation on the film at different exposure times and different power intensities was also studied in order to detect any changes occurring in the compound. A conventional ultraviolet lamp (UVP(3UV), 8 W, Thermo Fisher Scientific Inc.) with three different wavelengths (365 nm, 302 nm and 254 nm, respectively) was used. FIG. 4 illustrates the effect of ultraviolet exposure time on the film as a function of toughness at the three different wavelengths. FIG. 4 shows that there is high stability of the compound at the three selected wavelengths. FIG. 5 represents the effect of ultraviolet power intensity on the film, also as a function of toughness at the three different wavelengths. FIG. 5 shows that the film has a very high stability under these conditions as well. Thus, the doping of PVA with $H_3PW_{12}O_{40}$ not only enhances the optical shielding properties of PVA, but increases its relative stability for ultraviolet radiation exposure, and prevents the structure from any changes due to the effects of applied ultraviolet radiation.

It is to be understood that the present invention is not limited to the embodiment described above, but encompasses any and all embodiments within the scope of the following claims.

We claim:

1. A method of making an ultraviolet shielding film that is transparent in the visible light spectrum and shields approximately 100% of ultraviolet A, B, C radiation, comprising the steps of:
  forming a polymeric solution of approximately 6 g of polyvinyl alcohol having an average molecular weight of 17 kg/mol dissolved in approximately 100 mL of deionized water, wherein the step of forming the polymeric solution further comprises stirring the polymeric solution at a temperature of approximately 70° C. for a period of approximately three hours following the dissolving of the polyvinyl alcohol in the deionized water;
  dissolving approximately 3 g of phosphotungstic acid in deionized water to form an acidic solution;
  adding the acidic solution to the polymeric solution to form a mixture;
  thickening the mixture;
  casting the mixture; and
  drying the mixture to form the ultraviolet shielding film with a thickness of between approximately 0.99 mm and 0.11 mm.

2. The method of making an ultraviolet shielding film as recited in claim 1, wherein the step of thickening the mixture comprises evaporating water from the mixture for a predetermined period of time so that the mixture reaches a desired viscosity.

3. The method of making an ultraviolet shielding film as recited in claim 2, wherein the step of thickening the mixture comprises evaporating water from the mixture for approximately two hours at room temperature.

4. The method of making an ultraviolet shielding film as recited in claim 3, wherein the step of drying the mixture comprises heating the mixture.

5. The method of making an ultraviolet shielding film as recited in claim 4, wherein the step of heating the mixture comprises heating the mixture for a time period of approximately 48 hours at a temperature of approximately 60° C.

6. The method of making an ultraviolet shielding film as recited in claim 1, wherein the ratio of phosphotungstic acid to polyvinyl alcohol is one.

* * * * *